United States Patent [19]

Nicolas et al.

[11] 4,059,664

[45] Nov. 22, 1977

[54] METHOD OF MANUFACTURING FERRIMAGNETIC MATERIAL FOR RECORDING, READ OUT AND ERASE HEADS UTILIZED IN MAGNETIC LAYER DEVICES

[75] Inventors: Jean Nicolas; Alain Lagrange; Mieczyslaw Hildebrandt, all of Paris, France

[73] Assignee: Thomson-CSF, Paris, France

[21] Appl. No.: 592,657

[22] Filed: July 2, 1975

Related U.S. Application Data

[63] Continuation of Ser. No. 313,339, Dec. 8, 1972, abandoned.

[30] Foreign Application Priority Data

Dec. 14, 1971 France .............................. 71.44897

[51] Int. Cl.² .............................................. C04B 35/30
[52] U.S. Cl. ........................................ 264/66; 264/63; 264/65; 252/62.62; 423/594
[58] Field of Search .................... 423/594; 252/62.62, 252/63; 264/65, 66

[56] References Cited

U.S. PATENT DOCUMENTS

| | | | |
|---|---|---|---|
| 3,036,007 | 5/1962 | Buykx et al. ................ | 252/62.62 X |
| 3,142,645 | 7/1964 | Zerbes ............................... | 252/62.62 |
| 3,189,550 | 6/1965 | Malinofsky .................... | 252/62.62 X |
| 3,472,780 | 10/1969 | Stuijts ............................... | 252/62.62 |

FOREIGN PATENT DOCUMENTS 644,639  10/1950  United Kingdom .............. 252/62.62

*Primary Examiner*—Jack Cooper
*Attorney, Agent, or Firm*—Cushman, Darby & Cushman

[57] ABSTRACT

A ferrimagnetic material imparts a very high efficiency and/or sensitivity to recording read-out and erase heads cooperating with magnetic layer devices.

The starting point of the manufacturing process of this material is a solution of mineral salts or oxides of zinc, nickel and iron, and, using physicochemical processes employed in the ceramic industry, in particular sintering under pressure, spinelle structure polycrystalline ferrites are produced which satisfy the general formula: $Ni_{1-x}Zn_xFe_{2(1+e)}O_4$ where x ranges between 0.5 and 0.7 and e ranges between −0.08 and +0.015.

8 Claims, 5 Drawing Figures

METHOD OF MANUFACTURING FERRIMAGNETIC MATERIAL FOR RECORDING, READ OUT AND ERASE HEADS UTILIZED IN MAGNETIC LAYER DEVICES

This is a continuation of application Ser. No. 313,339 filed Dec. 8, 1972 and now abandoned.

The present invention relates to a ferrimagnetic material of the ferrite type, highly suited to the manufacture of recording, read-out and erase heads or head assemblies, for magnetic memories. The memories concerned here are in particular, tape stores, disc stores or drum stores in which the magnetic film is deposited upon a substrate moving beneath the head or multihead system.

The head essentially comprises a magnetic circuit containing an air-gap and at least one winding (of conductor wire) having a multiple function (write-in, read-out, erasing.) Each function may be performed by a special head. Currently, the air gaps are in the order of one micron and the distance between head and magnetic film is in the same order of magnitude.

In order, under these conditions, to achieve efficient performance of the difficult functions, the magnetic circuit must be made using a material which satisfies the following requirements:

high recording and erase efficiency, thus substantial induction in the magnetic circuit for a given magnetic field, this presupposing a substantial saturation magnetisation and very high maximum induction;

high read-out efficiency, therefore a high magnetic permeability even in high frequency operation, and, furthermore, low losses which presupposes that the imaginary part of the complex relative permeability is relatively small (this will be gone into more detail at a later point);

excellent mechanical properties, in particular hardness, density (very fine grain), low porosity; these qualities enable the very accurate machining of the air gap (quasioptical polish) and good protection can be achieved against deterioration due to mechanical wear and to humidity or dust influences.

The known materials do not simultaneously satisfy the above requirements.

The invention relates to a material which does satisfy these requirements. In particular, this material enables adaptation to the optimum requirements to be obtained for a given frequency band, whilst in all cases conserving excellent mechanical qualities.

The material in accordance with the invention is a spinelle structured polycrystalline ferrite, the chemical composition of which satisfies the general chemical formula:

$Ni_{1-x} Zn_x Fe_{2+2e} O_4$ wherein $0.50 \leqq x \leqq 0.70$
and $0.08 \leqq e \leqq +0.015$ This material can be produced by a variety of manufacturing methods, which can be separated into three principal classes.

A. First variant form of the manufacturing process the preparation first of all comprises the choice of raw materials in the form of salts, for example sulphates of zinc, iron and nickel, having high purity as far as metal ions are concerned. The purity of iron sulphate is better than 99.5%, that of nickel sulphate better than 99% and that of zinc sulphate better than 99.5%. These sulphates are dissolved in water in proportions which enable the general chemical formula to be achieved.

The mixed salt is dehydrated at 220° C approximately, and then decomposed at around 800° C. The resultant powder is mixed with an organic binder (polyvinyl alcohol) in accordance with a prior art technique, and a granulate is obtained by screening.

The granulate can equally well be prepared from a slip by the known method of atomising. A disc is produced by pressing the granulate a pressure of 1 ton per cm², in a cylindrical mould. A heat-treatment between 500° and 600° C then eliminates the organic binder. The disc is then placed in an alumina press mould having a larger diameter than the disc diameter by around 2mm and two pistons. Alumina powder is then arranged in said free space as well as between the component and the pistons. The devices arranged in a vertical furnace. The assembly is arranged beneath a press bearing on one of the pistons. The temperature is first of all raised, without applying any pressure and uniformly over a period of 5 to 10 hours to between 1100° and 1200° C (the sintering temperature). When the set stage temperature has been reached, the pressure is applied at the rate of about ½ a ton to 1 ton per cm² for between 10 and 600 minutes. The time of application of the pressure should be the longer the lower the temperature. An increase in pressure can reduce the time required. After the pressure has been relaxed, the temperature is progressively brought back to the ambient temperature, over a period of five to ten hours. The rate of increase and decrease of temperature should be sufficiently slow to ensure that the components placed inside the furnace are not broken due to thermal shock. The component is then withdrawn from the mould and is ready for machining to give it the desired form.

b. Second variant form of the manufacturing process

The selected raw materials are oxides of iron, nickel and zinc, having a high purity ($\geqq$ 99%). The weights are calculated so that metal ions are present in the proportion set out in the general chemical formula, but with a different iron ratio in order to take account of the iron introduced during later operations of crushing, so that in the resultant formula the proportion of metal ions are in accordance with the general chemical formula.

The quantities of iron introduced during the operations of mixing and crushing are measured by means of known kinds of chemical analysis.

Obviously, in weighing the components, the firing losses observed in the raw materials during later heat treatments, are taken into account. The raw materials, zinc, nickel and iron oxides, are mixed and then crushed in steel vessels containing steel balls, this in the presence of distilled water, for a period of 24 hours. The mixture is then dried and the resultant powder is fired (heat treatment at a temperature ranging between 900° and 1200° C, for between 1 and some few hours). The thus treated product is crushed in the aqueous phase in an iron vessel containing steel balls, for 48 hours. After crushing has been completed, the water is removed by evaporation and the powder treated in the manner described in the first variant embodiment to the process, to produce the final component.

c. Third variant embodiment of the manufacturing process

This variant consists in producing the material in the manner set out in the second variant, but in then directly carrying out sintering using the mixed powders of the raw materials. In this case, the starting composition, used for the calculation of the weights of the raw materials, will not be exactly the same because no iron will be introduced at the time of the operation of crushing the fire clay.

In relation to all the materials produced by the aforesaid methods, annealings at quite low temperatures can be carried out in order to prevent the occurrence of recrystallisation phenomena. These annealing operations can, by enlarging the crystallites, modify the characteristics such as permeability, high frequency losses.

The invention will be better understood and other of its features rendered apparent, from a consideration of the ensuing description and the attached drawings in which.

The various quantities and parameters being relatively numerous in the following discussion, it has been decided to make an alphabetical list of them at this point:

magnetisation per gramme "s" (magnetisation density in CGS units);
coercive field strength in Gauss ($H_c$);
apparent density (measured by the hydrostatic method):
$d_a$;
theoretical density (measured by X.ray techniques):
$dx$;
mean diameter of the crystallites in microns: $\phi$;
Vickers hardness under of 80 grammes force; MHV;
operating frequency in mc/s: F;
crossing frequency: $F_c$, i.e. frequency at which $\mu 1 = \mu 2$; see hereinafter the definition of these symbols;
magnetic induction at 5 oersteds in CGS units; B (5Oe);
maximum induction in CGS units: $B_m$;
magnetisation intensity: $4\pi I_S$ (in CGS units);
magnetic permeability (values relative to air), namely;
real component $\mu 1$;
imaginary component $\mu 2$;
initial permeability (real component): $\mu_o$;
permeability at crossing frequency: $\mu_c$;
porosity coefficient: $[(dx - da)/da]$;
sintering pressure in tons per cm: $p_f$;
resistivity of the material: $\rho$ in ohm.cm;
sintering temperature: $t°$ C;
time of application of the sintering pressure, in minutes: T.

Nine examples of the material in accordance with the invention are listed hereinafter:

FIRST EXAMPLE

Figure 1:
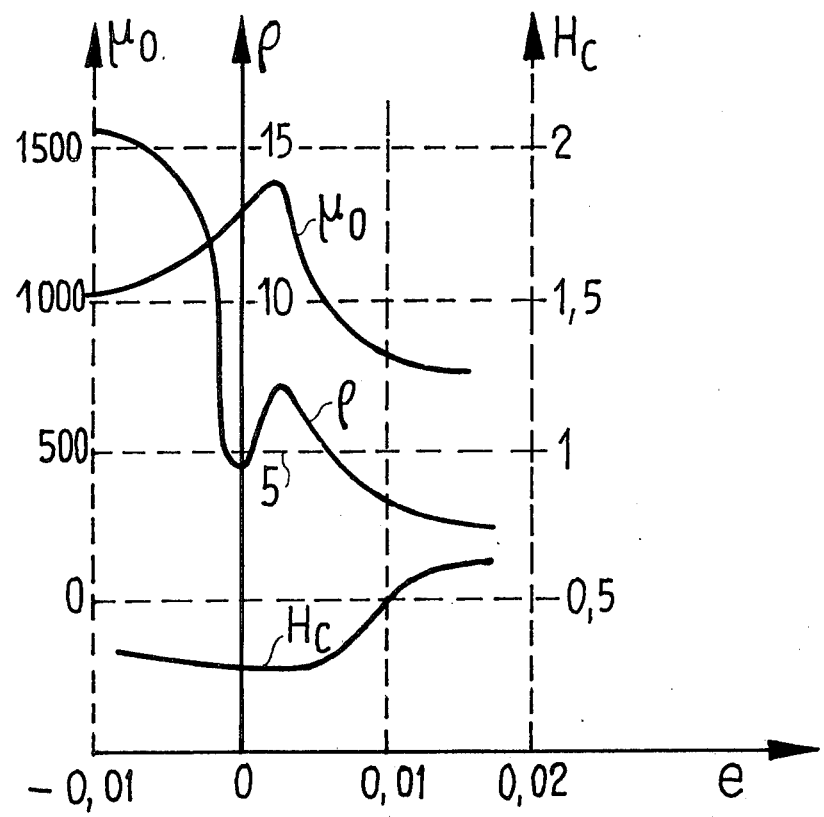
FIG. 1 is a graph of three electrical or magnetic characteristics relating to an example of a material in accordance with the invention when the parameter e in the general chemical formula is varied.

prepared by the process according to the first variant, with
$-0.08 \leq e \leq +0.015$
and the following sintering conditions:
$t = 1150° C$
$p_f = 0.5$ t/cm$^2$
$T = 60$ mn The results are as follows:
a. substantially constant parameters whatever e is:
$\phi = 2$ to 3 microns (see table 1 hereinafter);
ratio of apparent density to theoretical density greater than 99/100 (very low porosity);
b. variation of parameters $\mu_o$, and $H_c$:
In FIG. 1, the graph plotting the variation of these parameters as a function of the positive or negative value of e, has been illustrated.

It will be seen that the initial permeability 40 passes through a maximum for a very low positive value e and that the values obtained for $-0.005 \leq e \leq +0.005$ are equal to or greater than 1000.

Table 1

| e | s | $B_m$ | $F_c$ | $\phi$ |
|---|---|---|---|---|
| +0.005 | 56.1 | 2 993 | 7.5 | 2.2 |
| +0.002 | 55.8 | 2 917 |  | 3.2 |
| 0 | 55.3 | 2 935 | 7.5 | 2.5 |
| −0.002 | 54.9 | 3 082 | 8 | 1.9 |
| −0.004 | 55.4 | 3 018 | 7.5 | 3.5 | c) table of the parameters e, s, $B_m$, $F_c$ and $\phi$:

SECOND EXAMPLE

prepared according to the process of the first variant, with x varying from 0.5 to 0.7 (see table 2) and sintering carried out under the same conditions as for the first example.

The results were as follows:

Table 2

| a) Characteristics | x = 0.5 | x = 0.6 | x = 0.7 |
|---|---|---|---|
| $d_a$ | 5.30 | 5.30 | 5.30 |
| $4\pi I_s$ | 5 028 | 4 274 | 2 802 |
| $B_m$ | 3 836 | 3 386 | 2 150 |
| $H_c$ | 0.75 | 0.35 | 0.20 |
| $\mu_o$ | 380 | 740 | 1 550 |
| $F_c$ | 25 | 12.5 | 4 |
| $\phi$ | 2.8 | 3.7 | 2.7 |
| $\rho$ | $1.1 \cdot 10^7$ | $10^{11}$ | $0.5 \cdot 10^6$ |

Figure 2:
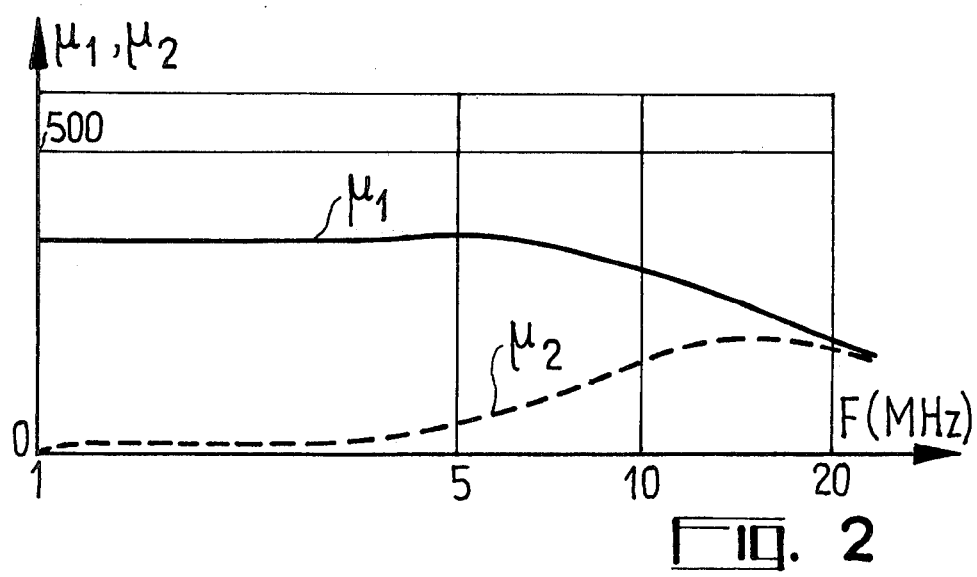
FIGS. 2 to 4 are graphs illustrating the real and imaginary components of the complex magnetic permeability, as a function of frequency, for three examples of materials in accordance with the invention.
Figure 3:
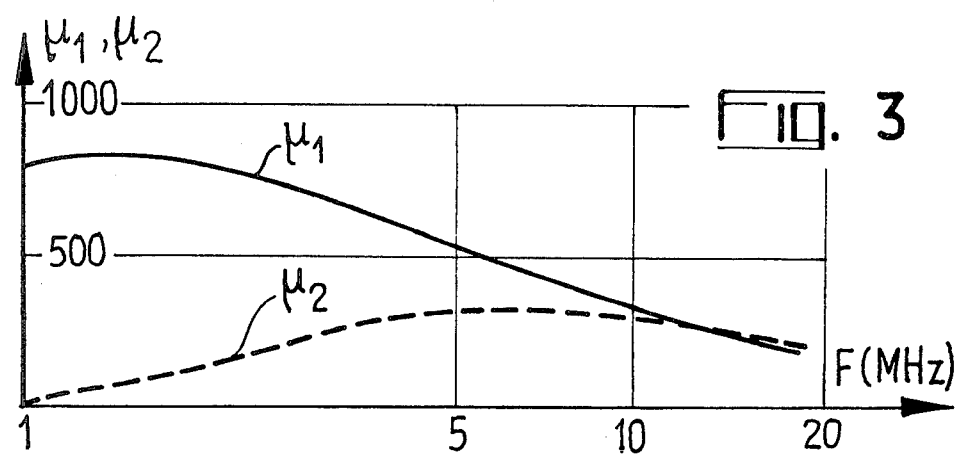

It will be seen that the initial permeability is greater for the high values of x that it is for the value x = 0.5, and that the crossing frequency, which is 25mc/s for x = 0.5 diminishes radically for x values in excess of this value.

b. graphs of complex relative magnetic permeability:

In FIGS. 2 and 3, for x = 0.5 and x = 0.6, the values of the real and imaginary components ($\mu_1$ and $\mu_2$ on the ordinates) have been plotted as a function of the frequency F of operation of the magnetic circuit (plotted on the abscissae).

It will be seen that the operating range defined by the crossing frequency, extends very substantially further into the high frequency range in the case of the material in FIG. 2 ($x = 0.5$) than it does in the case of the material of FIG. 3 ($x = 0.6$).

THIRD EXAMPLE

A material prepared by the manufacturing process of the second variant, of the general formula (final):

from an initial mixture of raw materials corresponding to the formula of:

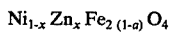

for two values of $x$ (0.65 and 0.70), $a$ varying from 0.01 to 0.015. The values "$e$" have not been specified and in fact the values of "$a$" depend upon the technology adopted. However, assuming that the manufacturing process to be used has been specified, the values of "$a$" will only differ very slightly from those indicated hereinafter (Tables 3 and 4).

a. properties which remain virtually unchanged within the range of variation of the parameter x and provided that a = less than 0.015 apparent density of 5.30;

very compact, low-porosity material;

very fine texture (grains in the order of 1 micron, $\phi =$ 1 to 2 microns);

high hardness MHV: 900 to 950;

material capable of having a very high polish.

b. table of the other characteristics (for quite a wide range of variation in $a$);

Table 3

| | | ($x = 0.65$) | | | |
|---|---|---|---|---|---|
| a | $4\pi I_S$ | $\rho$ | $B_m$ | $H_c$ | $\mu_o$ |
| 0 | 3 945 | 4.3·10³ | 2 913 | 0.75 | 474 |
| 0.01 | 3 780 | 5.6·10³ | 2 934 | 0.7 | 595 |
| 0.014 | 3 766 | 11.5·10³ | 2 868 | 0.6 | 695 |
| 0.016 | 3 661 | 4·10⁴ | 2 825 | 0.55 | 755 |
| 0.018 | 3 613 | 9.95·10⁵ | 2 735 | 0.45 | 813 |
| 0.020 | 3 654 | 8.50·10⁵ | 2 831 | 0.50 | 798 |
| 0.022 | 3 677 | 8.53·10⁵ | 2 726 | 0.55 | 783 |

Table 4

| | | ($x = 0.70$) | | | |
|---|---|---|---|---|---|
| a | $4\pi I_S$ | $\rho$ | $B_m$ | $H_c$ | $\mu_o$ |
| 0.005 | 3 057 | 3.6·10³ | 2 222 | 0.45 | 690 |
| 0.01 | 2 996 | 5.3·10³ | 2 222 | 0.45 | 749 |
| 0.015 | 2 832 | 2.12·10⁴ | 2 143 | 0.25 | 986 |
| 0.018 | 2 768 | 5.41·10⁴ | 1 963 | 0.20 | 1 119 |
| 0.02 | 2 626 | 3.50·10⁵ | 2 063 | 0.20 | 1 160 |
| 0.024 | 2 790 | 8.1·10⁶ | 2 080 | 0.25 | 1 010 |
| 0.028 | 2 857 | 1.15·10⁷ | 2 224 | 0.30 | 879 |

In fact, the value of $a = 0.015$ cannot be exceeded because beyond this value, recrystallization phenomena occur which result in excessive porosity and a deterioration in mechanical properties.

FOURTH EXAMPLE

This example corresponds to an adjustment of the value of the parameter $x$ ($a$ being held fixed, at for example 0.01) for a material corresponding to the definition mentioned in relation to the third example, the firing temperature being set at 1000° C however.

Table 5 lists the values of the characteristics measured for four values of $x$.

Table 5

| | | | ($a = 0.01$) | | | | | |
|---|---|---|---|---|---|---|---|---|
| x | $d_a$ | $4\pi I_S$ | $\rho$ | $B_m$ | $H_c$ | $\mu_0$ | $F_c$ | $\mu_c$ |
| 0.55 | 5.30 | 4 790 | 5.0·10³ | 3 275 | 1.45 | 250 | 32 | 160 |
| 0.60 | 5.30 | 4 345 | 5.3·10³ | 3 180 | 1.05 | 420 | 17 | 240 |
| 0.65 | 5.30 | 3 780 | 5.6·10³ | 2 934 | 0.70 | 595 | 10.5 | 350 |
| 0.70 | 5.30 | 2 996 | 5.3·10³ | 2 222 | 0.45 | 800 | 6.2 | 440 |

It will be seen, from a consideration of table 5, that the parameter $x$, other things being equal, regulates the induction $B_m$, the intial permeability (that is to say at low frequency) and the crossing frequency. Thus, x can be chosen, as required, to produce:

either materials having higher permeabilities but lower inductions $B_m$ and crossing frequencies;

or materials having higher crossing frequencies and higher inductions $B_m$, but lower permeabilities.

FIFTH EXAMPLE

Material of the general formula:

$$Ni_{0.35} Zn_{0.65} Fe_2 O_4$$

manufactured by the process of the second variant, from crystallised sulphate of Ni, Zn, Fe, whose proportions in weight, are as follows:

Ni SO$_4$, 6 H$_2$O: 77.05

Zn SO$_4$, 7 H$_2$O: 156.53

Fe SO$_4$, 7 H$_2$O: 465.68

These salts are dissolved in between 1 and 1.2 liters of hot water and then mixed. The solution is then dried in an atomiser at a temperature of around 200° C. The mixture of sulfates thus obtained is then processed between 700° and 900° C in order to decompose them and produce the ferrite powder. At this stage, the product is coated, pressed in the form of tablets, and subjected to the synthethising process under pressure:

Temperature: 1150° C

Pressure: ½ ton per cm²

Time of application of pressure: 1 hour.

The characteristics obtained were as follows:

| $d_a$ | = 5.30 | $4\pi I_S$ | = 3 645 |
|---|---|---|---|
| $\phi$ | = 4 | $H_c$ | = 0.25 |
| MHV | = 850 | $\mu_o$ | = 1 170 |
| $\pi$ | = 17·10³ | $F_c$ | = 8 |
| | | $\mu_c$ | = 480 |

This material is well-suited for applications involving frequencies below 8 Mc/s.

SIXTH EXAMPLE

The second variant of the process was used. The quantities of oxides corresponding to the chemical formula:

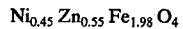

were weighed or in other words, taking account of the firing losses suffered by the various oxides Fe$_2$ O$_3$: 201.29 g NiO: 43.02 g ZnO: 56.99 g The above oxides (purity $\geq$ 99.5%) were weighed, then mixed and crushed in vessels containing steel balls (790 g) in the presence of distilled water (380 cm³) the weight of the powder mixture being around 300 g.

The slip thus obtained is stove-dried at 120° C approximately and then screened. The product is then fired at 1000° C in air. The fireclay is crushed for 48 hours under the same conditions as before. The product was then coated with an organic binder and pressed to form discs. The synthesis under pressure takes place in the following manner: heating of the sample at 1150° C followed by application of the pressure (½ ton/cm² for one hour). The pressure is then removed and the specimen cooled in a controlled manner, down to ambient temperature.

The characteristics obtained were as follows:

| | | | | |
|---|---|---|---|---|
| $d_a$ | = 5.32 | $4\pi I_S$ | = | 4 790 |
| $\phi$ | = 1 | $B_m$ | = | 3 275 |
| $\rho$ | = $5 \cdot 10^3$ | $H_c$ | = | 1.45 |
| MHV | = 930 | $\mu_o$ | = | 250 |
| $F_c$ | = 32 | $\mu_c$ | = | 160 |

Figure 4:
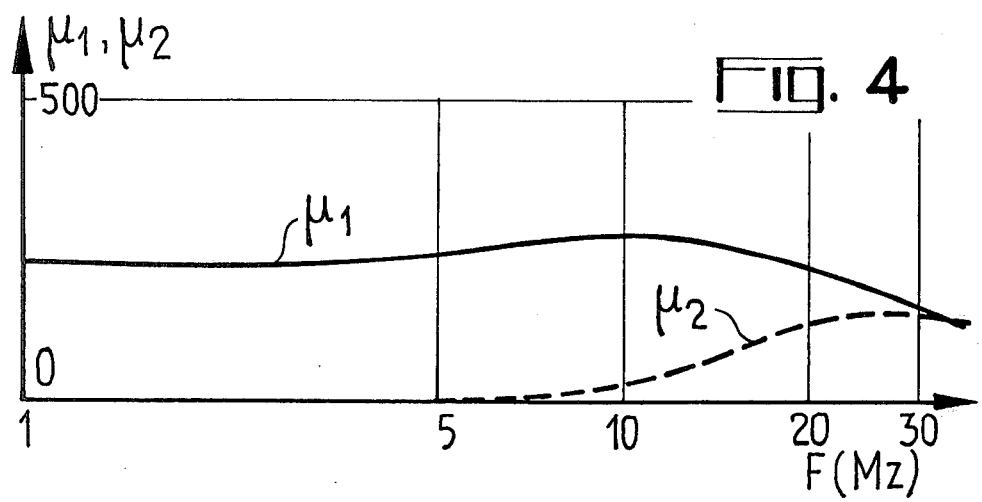

It will be seen that this material is suitable for frequencies below 32 Mc/S (see the graph of FIG. 4, which is similar to those of FIGS. 2 and 3).

SEVENTH EXAMPLE

The second variant of the manufacturing process was utilised, the firing temperature being set at 1000° C. The quantities of oxides corresponding to the chemical formula:

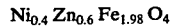

$Ni_{0.4} Zn_{0.6} Fe_{1.98} O_4$ were weighed, or in other words, taking into account the firing losses suffered by the different oxides:
$Fe_2 O_3$: 201.29 g
NiO: 38.24 g
ZnO: 62.17 g
The characteristics obtained were as follows:

| | | | | |
|---|---|---|---|---|
| d | = 5.32 | $4\pi I_S$ | = | 4 345 |
| $\phi$ | = 1.1 | $B_m$ | = | 3 225 |
| $\rho$ | = $5.3 \cdot 10^3$ | $H_c$ | = | 1.05 |
| MHV | = 920 | $\mu_o$ | = | 420 |
| $F_c$ | = 17 | $\mu_c$ | = | 230 |

EIGHTH EXAMPLE

The second variant of the manufacturing process was used, the firing temperature being set at 1100° C. The quantities of oxides corresponding to the gross chemical formula:

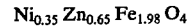

$Ni_{0.35} Zn_{0.65} Fe_{1.98} O_4$ were weighed in the following proportions or in other words, taking account the firing losses suffered by the various oxides:
$Fe_2 O_3$: 199.87
NiO: 33.22
ZnO: 66.87
The characteristics obtained were as follows:

| | | | | |
|---|---|---|---|---|
| $d_a$ | = 5.32 | $4\pi I_S$ | = | 3 690 |
| $\phi$ | = 1.2 | $B_m$ | = | 2 960 |
| $\rho$ | = $10^4$ | $H_c$ | = | 0.55 |
| MHV | = 920 | $\mu_o$ | = | 700 |
| $F_c$ | = 10.5 | $\mu_c$ | = | 350 |

NINTH EXAMPLE

The material of the eighth example fired for 1 hour at 1150° C, in atmospheric air:

The characteristics obtained were as follows:

| | | | | |
|---|---|---|---|---|
| $d_a$ | = 5.32 | $4\pi I_S$ | = | 3 785 |
| $\phi$ | = 1.3 | $B_m$ | = | 3 060 |
| $\rho$ | = $18 \cdot 10^3$ | $H_c$ | = | 0.52 |
| MHV | = 930 | $\mu_o$ | = | 800 |
| $F_c$ | = 7.4 | $\mu_c$ | = | 440 |

Figure 5:
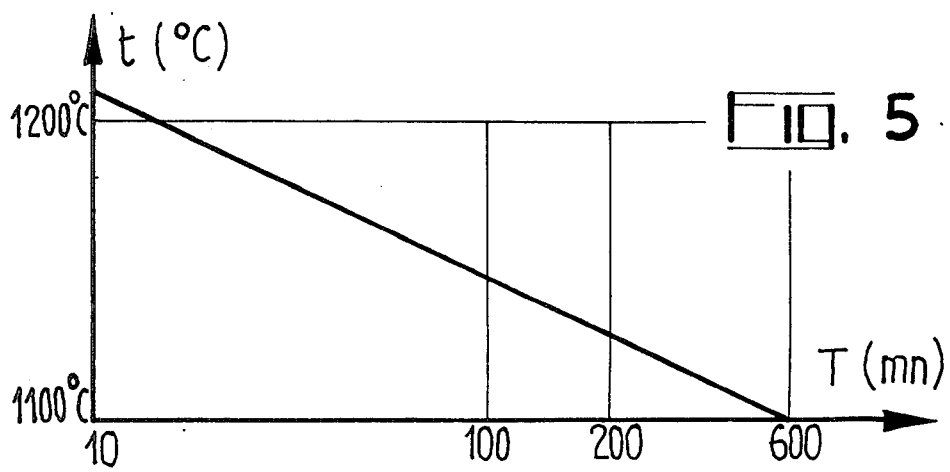
FIG. 5 is a graph illustrating the sintering temperature as a function of the time of application of the sintering pressure.

In respect to the first variant of the manufacturing process, it was pointed out that it was possible to control sintering under pressure as a function of temperature. This characteristic is common to all the variant forms. Moreover, experience has shown that there is a relationship between the time of application of the sintering pressure, and the sintering temperature. In the graph of FIG. 5, on the ordinates the sintering temperature has been plotted from 1100° C onwards (origin temperature on the ordinates) and on the abscissae the time of application of the pressure in minutes (logarithmic scales) has been plotted. The curve of variation of $t$ is a function of T is a straight line.

The sintering time varies from 10 to 600 minutes.

In addition to the excellent mechanical qualities exhibited by the materials in accordance with the invention, it will be evident from the range of examples described hereinbefore, that material types can be chosen which correspond:
either to maximum recording and erase efficiency, this through selection of the models possessing the greatest saturation magnetisation intensity and the greatest maximum induction;
or maximum read-out efficiency for a certain frequency or for a certain frequency range, this through the selection of the materials which possess an appropriate crossing frequency.

What we claim is:

1. A method of manufacturing a polycrystalline, spinelle structure ferrimagnetic material, the overall chemical composition of which satisfies the general formula:

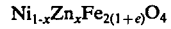

$Ni_{1-x} Zn_x Fe_{2(1+e)} O_4$ where
$0.50 \leq x \leq 0.70$ and
$-0.08 \leq e \leq +0.015$
exhibiting a porosity coefficient at most 1%, the microscopic structure thereof composed of grains having a mean diameter not in excess of 5 microns, comprising the following stages:
mixing zinc, nickel and iron oxides having a purity of better than 99% in order to obtain proportions of metal atoms and oxygen, as indicated by the gross formula:

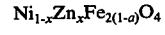

$Ni_{1-x} Zn_x Fe_{2(1-a)} O_4$ where x ranges between 0.50 and 0.70 and "a" between 0.01 and 0.015 account being taken of the known firing losses occurring during the later heat treatments; crushing in steel vessels using steel balls and distilled water, for around 24 hours; firing at a temperature ranging between 900° C and 1200° C, and further crushing in steel vessels using steel balls and distilled water, for around 48 hours; drying the mixture thus obtained; mixing the powder obtained, with an organic binder; obtaining a granulate from said mixture; pressing said granulate in suitably shaped moulds; heat treating to eliminate the binder; sintering at a temperature of about 1100° C to about 1200° C, at a pressure from 0.5 to 1 ton/cm², and for a period of time from about 15 to 300 minutes, the time of application of sintering pressure being related to sintering temperature according to FIG. 5.

2. A method of manufacturing a polycrystalline, spinelle structure ferrimagnetic material according to claim 1, wherein $x$ is 0.55.

3. A method of manufacturing a polycrystalline, spinelle structure ferrimagnetic material according to claim 1, wherein $x$ is 0.60.

4. A method of manufacturing a polycrystalline, spinelle structure ferrimagnetic material according to claim 1, wherein $x$ is 0.65.

5. A method of manufacturing a polycrystalline, spinelle structure ferrimagnetic material according to claim 1, wherein $x$ is 0.70.

6. A method of manufacturing a polycrystalline, spinelle structure ferrimagnetic material according to claim 1, wherein the firing temperature is 1000° C.

7. A method of manufacturing a polycrystalline, spinelle structure ferrimagnetic material according to claim 1, wherein the firing temperature is 1100° C.

8. A method of manufacturing a polycrystalline, spinelle structure ferrimagnetic material according to claim 1, wherein the firing temperature is 1150° C.

* * * * *